United States Patent
Hoctor et al.

(10) Patent No.: US 9,100,307 B2
(45) Date of Patent: Aug. 4, 2015

(54) SYSTEMS AND METHODS FOR COMMUNICATING ULTRASOUND DATA BY ADJUSTING COMPRESSION RATE AND/OR FRAME RATE OF REGION OF INTEREST MASK

(71) Applicant: General Electric Company, Schenectady, NY (US)

(72) Inventors: Ralph Thomas Hoctor, Saratoga Springs, NY (US); Pierino Gianni Bonanni, Loudonville, NY (US); Stephen Francis Bush, Latham, NY (US); Michael Joseph Dell'Anno, Clifton Park, NY (US); Stanislava Soro, Niskayuna, NY (US); Michael James Hartman, Clifton Park, NY (US); John Erik Hershey, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 219 days.

(21) Appl. No.: 13/711,433

(22) Filed: Dec. 11, 2012

(65) Prior Publication Data
US 2014/0164596 A1 Jun. 12, 2014

(51) Int. Cl.
*G06F 15/16* (2006.01)
*H04L 12/26* (2006.01)
(Continued)

(52) U.S. Cl.
CPC ........ *H04L 43/0876* (2013.01); *H04L 43/0894* (2013.01); *H04L 47/25* (2013.01); *H04L 47/38* (2013.01)

(58) Field of Classification Search
CPC ...... H04L 43/0894; H04L 47/25; H04L 47/38
See application file for complete search history.

(56) References Cited

U.S. PATENT DOCUMENTS

| 5,497,777 A | 3/1996 | Abdel-Malek et al. |
| 5,619,998 A | 4/1997 | Abdel-Malek et al. |

(Continued)

FOREIGN PATENT DOCUMENTS

| CN | 101904751 A | 12/2010 |
| CN | 102327131 A | 1/2012 |
| WO | 2008066682 A2 | 6/2008 |

OTHER PUBLICATIONS

De Cunha, D et al., "The MIDSTEP system for ultrasound guided remote telesurgery", Engineering in Medicine and Biology Society, 1998. Proceedings of the 20th Annual International Conference of the IEEE, Issue Date: Oct. 29-Nov. 1, 1998, on page(s): 1266, Print ISBN: 0-7803-5164-9.

(Continued)

*Primary Examiner* — Lance Leonard Barry
(74) *Attorney, Agent, or Firm* — The Small Patent Law Group LLC; Christopher R. Carroll

(57) ABSTRACT

Systems and methods for communicating ultrasound data are provided. One method includes monitoring over time estimates of bandwidth of a channel communicatively coupling an imaging location with another location remote from the imaging location and communicating the estimates to a system at the imaging location. The method also includes identifying at least one of a region-of-interest (ROI) mask or one or more transmission parameters for the channel and adjusting at least one of the ROI mask or the one or more transmission parameters based on the monitored estimates of the bandwidth for communicating the medical images.

19 Claims, 8 Drawing Sheets

(51) Int. Cl.
*H04L 12/811* (2013.01)
*H04L 12/825* (2013.01)

(56) References Cited

U.S. PATENT DOCUMENTS

| | | | |
|---|---|---|---|
| 5,877,801 A | 3/1999 | Martin et al. | |
| 6,045,507 A | 4/2000 | Muzilla et al. | |
| 6,633,674 B1 | 10/2003 | Barnes et al. | |
| 6,829,391 B2 * | 12/2004 | Comaniciu et al. | 382/243 |
| 7,076,091 B2 * | 7/2006 | Rosenfeld | 382/131 |
| 8,031,771 B2 * | 10/2011 | Chen et al. | 375/240.1 |
| 8,184,069 B1 * | 5/2012 | Rhodes | 345/8 |
| 8,868,716 B2 * | 10/2014 | Muralidharan | 709/224 |
| 2004/0002652 A1 | 1/2004 | Phelps et al. | |
| 2004/0143679 A1 * | 7/2004 | Ogikubo | 709/247 |
| 2005/0058197 A1 * | 3/2005 | Lu et al. | 375/240.03 |
| 2006/0058609 A1 | 3/2006 | Olstad | |
| 2006/0122482 A1 * | 6/2006 | Mariotti et al. | 600/407 |
| 2007/0113242 A1 | 5/2007 | Fetkovich | |
| 2007/0237402 A1 | 10/2007 | Dekel et al. | |
| 2008/0077702 A1 * | 3/2008 | Posamentier | 709/232 |
| 2008/0218588 A1 | 9/2008 | Stetten | |
| 2010/0080476 A1 | 4/2010 | Khorasani et al. | |
| 2010/0202510 A1 | 8/2010 | Kyle | |
| 2010/0298711 A1 | 11/2010 | Pedersen et al. | |
| 2012/0327218 A1 * | 12/2012 | Baker et al. | 348/135 |

OTHER PUBLICATIONS

Unofficial translation of Chinese Office Action and Search Report from corresponding CN Application No. 201310674509.X dated Mar. 19, 2015.

* cited by examiner

SYSTEMS AND METHODS FOR COMMUNICATING ULTRASOUND DATA BY ADJUSTING COMPRESSION RATE AND/OR FRAME RATE OF REGION OF INTEREST MASK

BACKGROUND

Remote health care services, such as performing diagnostic imaging in remote locations that otherwise may not have adequate health care facilities, are increasing. The remote health care practice area is growing, due in part to cost reduction, faster diagnosis and the overall efficiency provided by a partial decentralization of health care dispensaries.

In remote health care, a patient may be examined by a remote health care practitioner (RHCP) in a medical dispensary remote from a major medical center such as a hospital. The RHCP may perform a protocol for a diagnostic test and possibly some treatment under the guidance and supervision of a specialist located at the major medical center. Communication between the RHCP and the specialist may be accomplished by a variety of communication modalities, which may exhibit communications having dynamic bandwidth, that is, a varying Quality of Service (QoS). If the effect of the varying QoS on the communications between the RHCP and the specialist is not recognized, characterized, and compensated for, in some instances the overall process is less efficient and may result in difficult or improper diagnosis.

However, in diagnostic ultrasound imaging, for example, diagnostic ultrasound image quality has no agreed upon metric. Typically, communication engineers use computational measures such as a mean squared error computed over a region of pixel values. This type of image quality assessment may be called objective. Objective quality assessment will have shortcomings for the particular computational measure selected. For example, if the mean squared error is selected as the computational error, and this error is on average very low, the assumption is that the displayed image is probably true to the original. However, a low mean squared error can arise from noise corruption that is significant in only a small portion of the transmission and this can lead to a significant image artifact. At the other end of the image quality definition are the subjective measures. These measures are typically formed by the opinion scores of expert image interpreters. Empaneling a set of experts to assess the image quality of a routine image transmission is impractical.

Thus, with conventional structures and methods, streaming data for a remote ultrasound examination does not provide a reasonable expectation of delivering a smooth presentation of adequate image quality. Moreover, even if image quality could be reliably automated so that the quality level satisfied expert image interpreters, the end goal of a transmitted image is not the quality per se, but instead the value in facilitating forming a correct diagnosis of the patient's condition. These same issues are present in conventional image compression, in particular when certifying the admissibility of lossy compression techniques and, if allowed, a determination and specification of acceptable limits on the type and degree of loss incurred by a particular compression technique. As a result, when working with transmitted medical imagery, it is typical to rely on the transmission channel's bandwidth as the main, if not sole, parameter for use in estimating image quality, which may not perform satisfactorily, particularly for a communication channel having varying bandwidth.

SUMMARY

In one embodiment, a method for controlling transmission of medical images is provided. The method includes monitoring over time estimates of bandwidth of a channel communicatively coupling an imaging location with another location remote from the imaging location and communicating the estimates to a system at the imaging location. The method also includes identifying at least one of a region-of-interest (ROI) mask or one or more transmission parameters for the channel and adjusting at least one of the ROI mask or the one or more transmission parameters based on the monitored estimates of the bandwidth for communicating the medical images.

In another embodiment, an image communication system is provided that includes a first workstation located at one location, wherein the workstation is configured to acquire medical images from an imaging apparatus, and a transceiver coupled to the first workstation. The image communication system also includes a second workstation at a location remote from the first workstation and a transceiver coupled to the second workstation, wherein the transceivers coupled to the first and second workstations form a communication link therebetween. The image communication system further includes a link analysis unit (LAU) at the location of the second workstation, wherein the LAU is configured to monitor over time estimates of bandwidth of the communication link and communicate the estimates to the first workstation or the transceiver coupled to the first workstation. At least one of a region-of-interest (ROI) mask or one or more transmission parameters for the communication link is adjusted based on the monitored estimates of the bandwidth for communicating the medical images.

DETAILED DESCRIPTION

Figure 1:
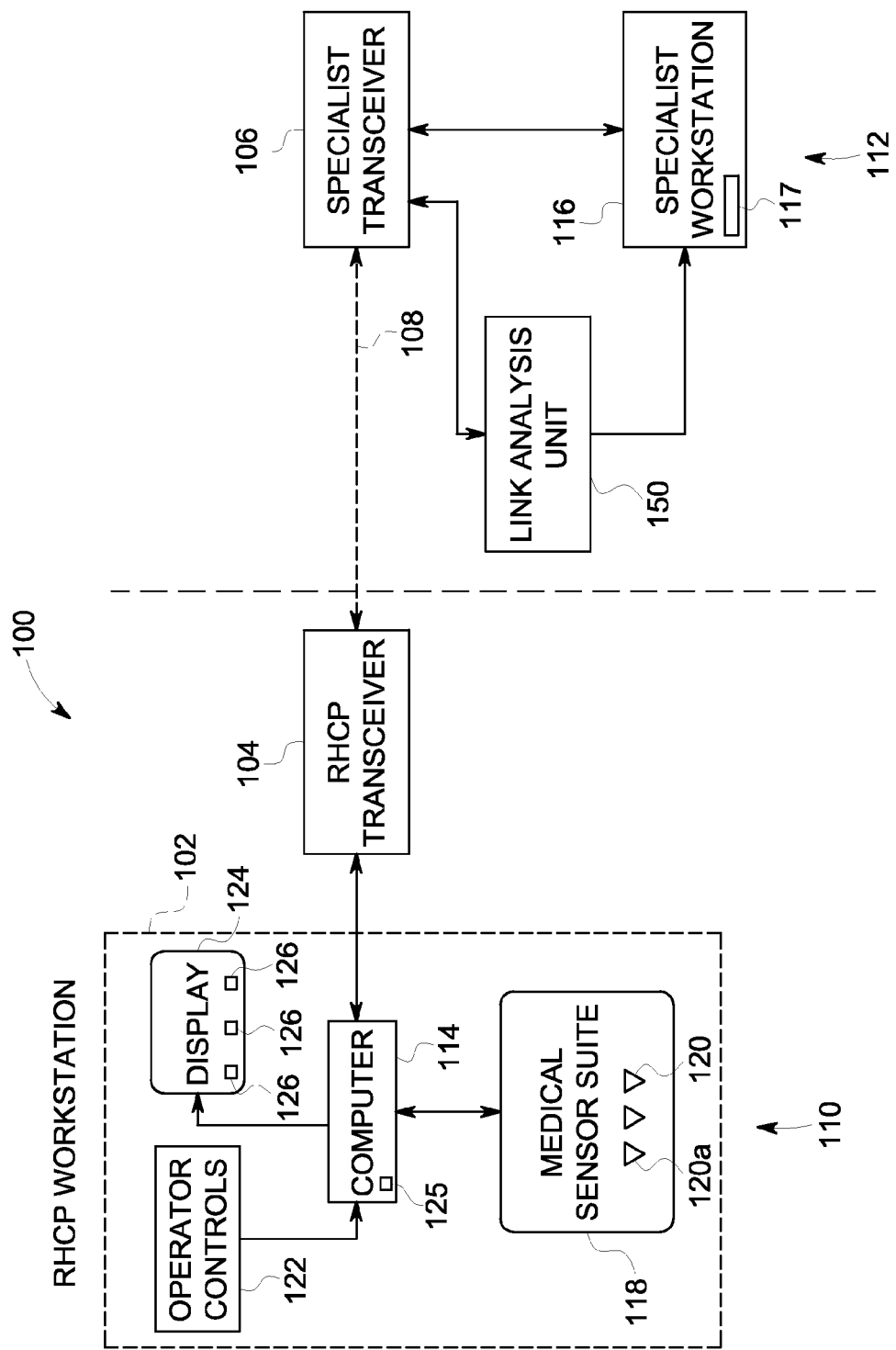
FIG. 1 is a schematic block diagram of an image communication system formed in accordance with an embodiment.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers, circuits or memories) may be implemented in a single piece of hardware or multiple pieces of hardware. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide communication of imaging data, which in one embodiment is diagnostic ultrasound data. The communication channel(s) in some embodiments have a dynamic effective bandwidth and various embodiments may provide virtual streaming delivery of sequential ultrasound image frames over one or more of the communication channels having an effective bandwidth that varies. For example, typical of a protocol of diagnostic testing is an ultrasound examination. An ultrasound examination may last several minutes. It can be distracting and unhelpful to a health care professional to view the successive imagery frames if the presentation of the imagery departs from a streaming mode and there are starts and stops in the presentation. It also may be distracting and unhelpful if the image resolution degrades severely or if visual artifacts result from a poor communications channel. At least one technical effect of various embodiments is an increased stability in streaming image data, such as ultrasound image frames, wherein the streaming has reduced or eliminated stops and starts during the streaming and which may have a reduction in image resolution degradation or visual artifacts that may be caused by a communication channel having a varying effective bandwidth.

Various embodiments provide an imaging system that communicates information, such as diagnostic images, from one location (e.g., a patient examination site) to another location (e.g., a hospital remote from the examination site) over one or more communication channels, which in various embodiments, is streaming of a series or sequence of images over one or more communication channels that have a varying effective bandwidth. In one embodiment, for example, monitoring and/or continuous remote health care practitioner (RHCP) to specialist channel bandwidth estimation is provided, such as between a RHCP performing an ultrasound scan at a location remote from a health care facility and having communication channels that have varying effective bandwidths. Thus, various embodiments control the communication of a plurality of images (e.g., streaming images) over one or more communication channels.

FIG. 1 is a schematic block diagram of an image communication system 100 for communicating image data in accordance with various embodiments. The image communication system 100 is generally configured to acquire medical images, such as ultrasound imagery (e.g., a plurality of ultrasound images over time) at the RHCP's location and transmit that imagery to, for example, a remotely located specialist for viewing and consultation. The image communication system 100 includes an RHCP workstation 102 that allows acquisition of image data and interface with a user or operator, such as the RHCP. It should be noted that although various embodiments are described in connection with communicating ultrasound data, the various embodiments may be used to communication other types of medical and non-medical image data, such as other types of medical images, diagnostic audio, electrocardiogram (ECG) and other physiological waveforms, in a streaming manner.

The system 100 includes an RHCP transceiver 104 that communicates with a remote transceiver, which in the illustrated embodiment is a specialist transceiver 106. The transceivers 104, 106 communicate over or form a communication link 108, which may include one or more communication channels (e.g., cellular network communication channels), which in some embodiments have a varying effective bandwidth. Accordingly, the communication link 108 provides bi-directional or two-way communication between a first location 110 and a second location 112, which may be an examination location and a specialist location located remote therefrom (e.g., miles away), respectively, in one embodiment.

With respect to the first location 110 where the image data is acquired and processed, the RHCP workstation 102 includes a processor, which is illustrated as a computer 114. The computer 114 is coupled to the RHCP transceiver 104 to allow communication between the computer 114 and another workstation at the second location 112, illustrated as a specialist workstation 116, via the specialist transceiver 106. It should be noted that the RHCP transceiver 104 and the specialist transceiver 106 may form part of or be separate from the RHCP workstation 102 and the specialist workstation 116, respectively. It also should be noted that the workstations 102 and 116 may be any types of workstations usable by different types of operators.

Figure 2:
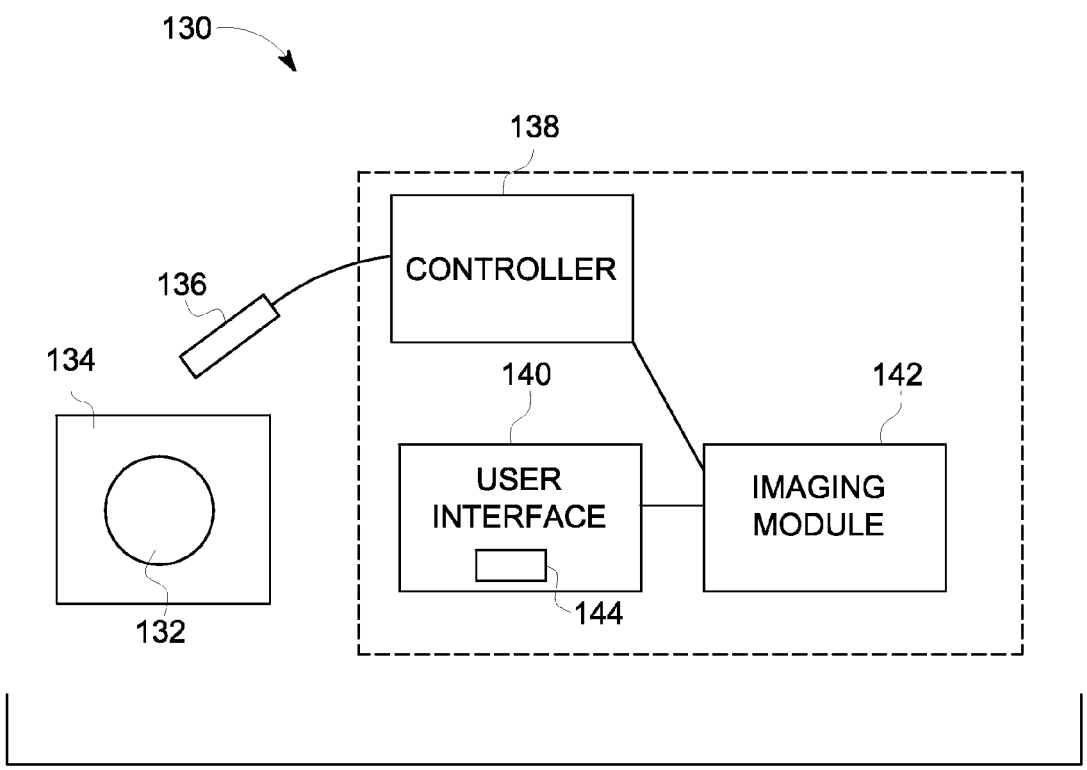
FIG. 2 is a block diagram of an ultrasound imaging apparatus that may be used to acquire image data for transmission by the system of FIG. 1.

The computer 114 is also connected to one or more medical devices 120 illustrated as a medical sensor suite 118. The medical devices 120 may be removably and operatively coupled to an interface (now shown) of the RHCP workstation 102 to allow communication therebetween. The medical sensor suite 118 may include a plurality of different types or kinds of medical devices, such as plurality of different types of medical imaging probes that may be used for different imaging applications. In one embodiment, the medical device 120a is an ultrasound imaging apparatus 130 as illustrated in FIG. 2 and described in more detail below.

The computer 114 is also coupled to a user input 122 that includes one or more user controls (e.g., keyboard, mouse and/or touchpad) for interfacing or interacting with the RHCP workstation 102. The computer 114 is also coupled to a display 124, which may be configured to display one or more ultrasound images 126, such as in a time sequence or loop of images, also known as a cine loop. In operation, a user is able to control the display of the images 126 on the display 124 using the user input 122, for example, controlling the particular display settings. The user input 122 may also allow a user to control the acquisition of the image data used to generate the images 126, such as the image acquisition settings or controls. In one embodiment, the user input 122 allows control of the ultrasound imaging apparatus 130 shown in FIG. 2.

The ultrasound imaging apparatus 130 is configured to acquire ultrasound image data that may be processed by the ultrasound imaging apparatus 130 or the RHCP workstation 102 to generate one or more images (e.g., 2D, 3D or 4D images) of a region of interest 132, for example an anatomy of interest, of a subject 134 (e.g. a patient). The ultrasound imaging apparatus 130 or the RHCP workstation 102 generates one or more images by reconstructing imaging data acquired by the ultrasound imaging apparatus 130. It should be noted that as used herein, imaging data and image data both generally refer to data that may be used to reconstruct an image.

In an exemplary embodiment, the imaging data is acquired with an imaging probe 136. In one embodiment, the imaging probe 136 may be a hand-held ultrasound imaging probe. Alternatively, the imaging probe 136 may be an infraredoptical tomography probe. The imaging probe 136 may be any suitable probe for acquiring ultrasound images in another embodiment. The imaging probe 136 is illustrated as being mechanically coupled to the ultrasound imaging apparatus 130. Alternatively or optionally, the imaging probe 136 may be in wireless communication with the ultrasound imaging apparatus 130. In still other embodiments, the imaging probe 136 is alternatively or optionally coupled to the RHCP workstation 102.

A controller 138 is provided to control scan parameters of the imaging probe 136. For example, the controller 138 may control acquisition parameters (e.g. mode of operation) of the imaging probe 136. In another embodiment, the controller 138 may control other scan parameters (e.g. gain, frequency, etc.) of the imaging probe 136. The controller 138 may control the imaging probe 136 based on scan parameters provided by an operator at a user interface 140. The operator may set the scan parameters of the imaging probe prior to image acquisition with the imaging probe 136. In one embodiment, the operator may adjust the scan parameters of the imaging probe during image acquisition. It should be noted that in some embodiments, the controller 138 is embodied as the computer 114 (shown in FIG. 1) and the user interface 140 is embodied as the user interface 122 (shown in FIG. 1). It should be noted that different types of user interfaces may be provided. For example, user operable controls or inputs may be provided, which may be physical controls or virtual controls, such as displayed on a screen or touch display. As another example, the user interface may be a telepathic interface controlled by brain signals.

An imaging module 142 is provided to reconstruct one or more images based on the imaging data acquired by the imaging probe 136. The imaging module 142 may include a processor or computer that reconstructs the images, which in some embodiments, forms part of the computer 114 (shown in FIG. 1). The imaging data may include 2D image slices over time. The imaging module 142 may combine (e.g. aligns, shifts, reorients, etc.) 2D image slices to reconstruct a cine loop that may be displayed as a sequential loop of 2D ultrasound images over time.

In one embodiment, a display 144 (which may be embodied as the display 124 of FIG. 1) is provided at the user interface 140. The reconstructed images may be displayed on the display 144 during the image acquisition. Alternatively, the reconstructed images may be displayed as a final image sequence after the completion of image acquisition. It should be noted, that the user interface 140 is illustrated as being embodied in the ultrasound imaging apparatus 130. The user interface 140 may be part of a separate workstation, such as the RHCP workstation 102 that is provided separate from the ultrasound imaging apparatus 130 in some embodiments.

In operation, data acquired by the ultrasound imaging apparatus 130 is accessible and may be communicated between the first location 110 and the second location 112 using the transceivers 104, 106. It should be noted that the transceivers 104, 106 may be configured to communicate using any suitable communication protocol, such as a suitable wireless communication protocol, such as cellular 3G communication protocols. Using this arrangement, data from the computer 114 at the RHCP workstation 102 may be transmitted to a specialist at the specialist workstation 116 and data sent from the specialist may be received at the RHCP workstation 102.

At the second location 112, which in one embodiment may be a hospital or health care facility having a specialist located there, a link analysis unit (LAU) 150 is configured to monitor the data received from the first location 110, via the transceivers 104, 106 and provide data to the specialist workstation 116 and/or the specialist transceiver 106 as described in more detail herein.

In various embodiments, the LAU 150 is a module or controller, which may be implemented in hardware, software, or a combination thereof. The LAU 150 is located proximate the specialist workstation 116, which in some embodiments forms part of the specialist workstation 116 or may be a module operatively coupled to the specialist workstation 116. The specialist workstation 116 may be a data server where multiple workstations may be connected and interacting with the RHCP workstation 102. The LAU 150 is configured to perform one or more functions, which in the illustrated embodiment allows for a bandwidth monitoring or continuous RHCP to specialist channel bandwidth estimation, which is communicated to the RHCP transceiver 104 via the specialist transceiver 106.

Figure 3:
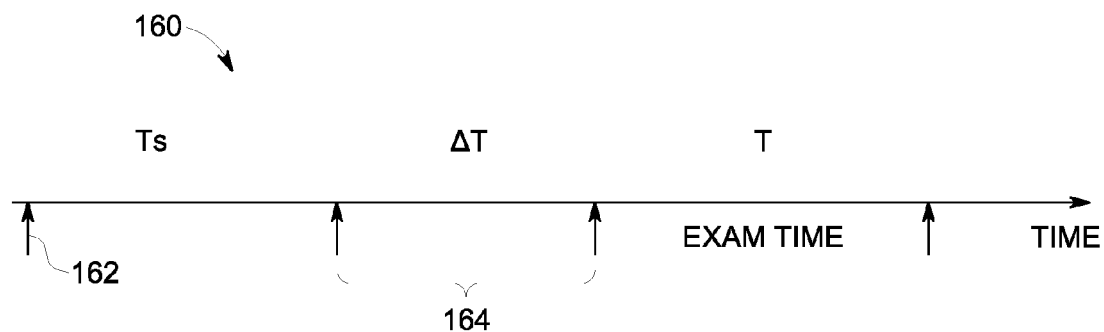
FIG. 3 is a diagram illustrating a timing sequence for an initial channel analysis in accordance with various embodiments.

In particular, the LAU 150 is configured to provide an estimate of the channel bandwidth (e.g., bandwidth of the communication link 108) with a confidence interval based on a channel model. In various embodiments, the estimated value is used with a rate-distortion model to predict the image quality during T seconds of the examination, to support a virtual streaming display (such as a smoothly presented display of ultrasound images over time without time breaks) of an ultrasound examination of length T seconds without decreasing image quality below a specified level. As illustrated in time graph 160 of FIG. 3, before the RHCP starts the ultrasound exam, the two-way channel between the RHCP and the specialist is established at 162 and the LAU 150 evaluates, analyzes or studies the RHCP to specialist channel for $T_S$ seconds before the RHCP starts the exam. The LAU 150 forms a channel model from the $T_S$-second study of the channel and any ancillary data available such as historical records (e.g., bandwidth QoS trends) and parameters input to the LAU 150, such as from the user. The LAU 150 then estimates the probability that the link can successfully support the imagery transmission session, which in various embodiments includes transmitting a sequence of ultrasound images over time at a minimum or acceptable level (e.g., without artifacts) to allow transmission of diagnostically relevant ultrasound images for evaluation. In operation, the LAU 150 functions as a feedback loop controller to the RHCP transceiver 104.

In particular, in one embodiment, initialization of the workstations 102, 116 prior to an ultrasound examination proceeds as follows (with reference to FIG. 3):

1. The operator enters the duration, T, of the ultrasound examination's imagery to be communicated across the RHCP to specialist communications link 108 and smoothly displayed to the specialist (e.g., to allow diagnostic analysis thereof), the initial ROI contraction mask 170 (shown in FIG. 4) and the placement thereof, and other initialization data such as communication parameters and imagery quantization and compression parameters. In one embodiment, the operator also enters ΔT 164, which is the upper time limit of the delay between the RHCP beginning the examination and the start of the display to the specialist. One result of this additional operator entry is to extend the imagery sequence transmission time by ΔT. If the operator does not enter a value for ΔT, ΔT is set to 0.

2. The two-way communication link 108 between the RHCP workstation 102 and the specialist workstation 116 is established and channel monitoring and modeling initiated and continued for a duration of at least $T_S$.

3. The LAU 150 determines if the link 108 can be reasonably expected to provide a smooth streaming presentation of adequate image quality additionally delayed by no more than ΔT between the display 124 of the RHCP workstation 102 and the display 117 of the specialist workstation 116. The analysis may include any suitable means for channel bandwidth monitoring.

4. If the determination in step 3 is positive, the examination proceeds. If the determination in step is not positive, the ΔT period is adjusted based on the minimum image quality and estimated channel bandwidth or, for example, the system can switch to a "store and forward" mode where data is stored or buffered before sending.

Once the examination is in process, the RHCP or the specialist may adjust the ROI contraction mask and the position of the mask's center as described in more detail herein.

Figure 4:
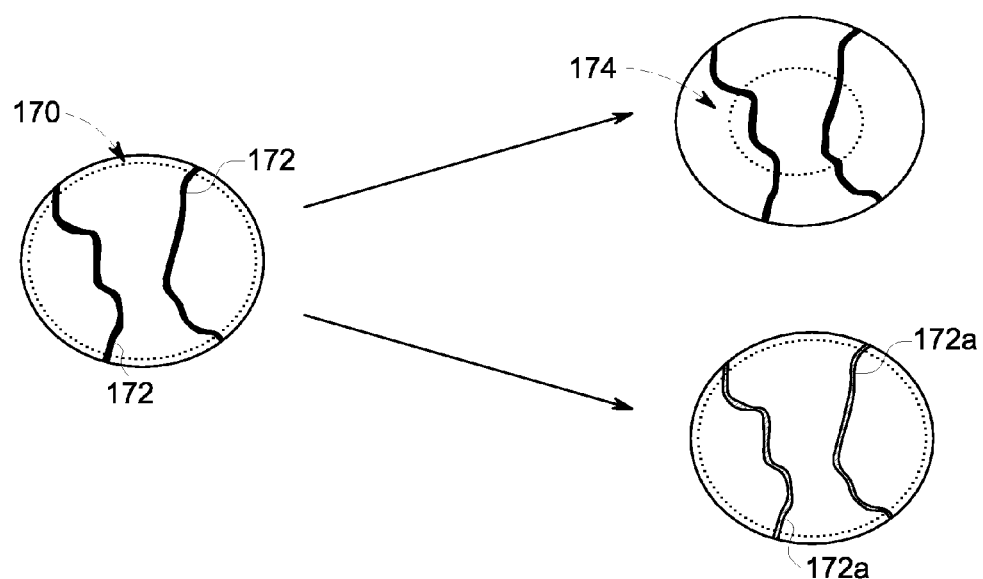
FIG. 4 is a diagram illustrating a region-of-interest (ROI) mask in accordance with various embodiments.

In various embodiments, the LAU 150 is operable to control the transmission of information over the communication link 108 using one or more different methods. For example, in various embodiments, the LAU 150 is operable to control a region-of-interest (ROI) contraction mask and the degree of lossy compression, which will be described in more detail herein. Both of these parameters may be used to lower the transmission rate from the RHCP workstation 102 while still ensuring image quality. In particular, the region of interest (ROI) contraction mask 170 as shown in FIG. 4 is a region of the image 126 specified by a user (or initially automatically selected), such as an RHCP or specialist outlining the area on a touch screen (or using a mouse for a non-touch screen display) or other boundary specification techniques such as those associated with JPEG2000. The outlined area may be identified using lines 172. As can be seen, the lines 172 may not be straight or have a constant curve, but may be configured as desired by the user, such as to identify a region of particular interest (e.g., to include blood flow in a particular area of the heart).

In some embodiments, the ROI contraction mask 170 may be contracted in an area 174 as the available bandwidth drops on the communication link 108 from the RHCP to the specialist. It should be noted that as used herein, contraction of the ROI contraction mask 170 (also referred to as the ROI mask 170) generally means that the ROI mask 170 is decreased or shrunk in physical size or extent, which may be proportionally applied along the entire boundary defined by the ROI mask 170. Alternatively, or in conjunction with the contraction of the ROI mask 170, the lossy compression may be increased as the available bandwidth decreases, illustrated by the fuzzy lines 172a. In this alternative embodiment, it should be noted that the increase in lossy compression may be only outside the image area enclosed by the ROI mask 170, only inside the image area enclosed by the ROI mask 170, or both outside and inside the image area enclosed by the ROI mask 170. For example, a compression rate outside of the ROI mask 170 may be reduced to maintain a constant compression rate inside the ROI mask 170, which include the image data of particular interest. Other parameters for communicating data associated with the image portion inside and outside of the ROI mask 170 also may be adjusted and may be different for each.

Contraction of the ROI mask 170 may be performed, for example, by a window analysis module (WAM) 125 operating on the computer 114 of the RHCP workstation 102. In one embodiment, the WAM module 125 may be programmed to perform the ROI mask contraction according to one or more of the following:

1. An RHCP's or specialist's stored preferred procedure;
2. A recommended or specified procedure;
3. A real-time occasional or continuous adjustment by the RHCP or the specialist; and/or 4. On command by the LAU 150 if the available bandwidth drops below the level needed to sustain the required or desired transmission rate.

With respect to control by the LAU 150 (4. above), and as an example, assume that the ROI is a circular region of radius R and that the area of a pixel is A. The ROI thus comprises $$\frac{\pi R^2}{A}$$

pixels. Further, assume that coding assigns B bits per pixel on the average. The amount of ROI image data, D, associated with the ROI is then $$D = \frac{\pi}{A}\frac{R^2}{B}$$

bits. The two variables that the LAU 150 may use to fulfill control of the data transmission are R and B. The sensitivities of the amount of ROI image data to these variables may be defined as follows:

$$D_R = \frac{\partial D}{\partial R} = \frac{2\pi}{A}(RB)$$

$$D_B = \frac{\partial D}{\partial B} = \frac{\pi}{A}R^2$$

Because R is more nearly a continuous variable than B, it should be noted that a reduction in the amount of ROI image data may be effected by reducing the average number of bits per pixel rather than reducing B by an integer amount. In one embodiment, the WAM 125 may be programmed to change D according to a directional derivative such as $\alpha(R,B)D_R + \beta(R,B)D_B$ where the coefficients $\{\alpha(R,B), \beta(R.B)\}$ are provided by a table or function.

In one embodiment, the feedback estimate of the RHCP to specialist channel feedback that controls the WAM 125 may also facilitate notification by the RHCP by causing an acoustic signal such as a tone to be emitted from the workstation, the frequency of the tone indicative of the channel's condition. For example, a relatively high audio frequency might indicate good channel quality and a relatively low frequency might indicate a degraded channel quality. Also, visible indicators, such as a changing light may be provided.

It should be noted that the use of lossy coding and progressive transmission may be used if and as the link quality degrades. The choice of a lossy coding technique is used in various embodiments to maintain adequate image quality. For example, sub-band coding used with progressive transmission reduces or avoids block artifacts that may arise when using compression methods based on block transforms such as with some JPEG compression. The JPEG2000 compression technique is based on wavelets and is well suited to progressive transmission resulting in image quality improvement as more data is received. It should be noted that JPEG is merely one example of a compression technique and various embodiments are not limited to a particular compression. For example, other types of compression includes, MPEG and h.264, among others.

In another embodiment, the lossy compression method selected for use with progressive transmission may involve some despeckling of the ultrasound images. Narrowband ultrasound is a coherent imaging technique and the images produced thereby are suffused with speckle noise. It should be noted that speckle noise behaves as multiplicative noise rather than additive. Accordingly, the speckle phenomenon may be defined in a quasi-linear fashion by considering the logarithm of the image such as in performing a multi-resolution decomposition. Nonlinear processing methods also may be used, such as applying a bank of oriented one-dimensional median filters to the image and setting each point's value to the largest value reported from all of the filters in the filter bank. This method reduces speckle noise and preserves the image's structure and in particular the "thin bright streaks" which occur between tissue layers when imaging tissue. Based on wavelet transforms, another nonlinear technique that may be used is described in U.S. Pat. Nos. 5,619,998 and 5,497,777, both of which are commonly assigned.

The LAU 150 also may estimate the QoS of the received symbols (e.g., data bits) from the RHCP transceiver 104, which is described in more detail herein. This estimation may be used to perform improved decoding of some forward error correction codes.

Figure 5:
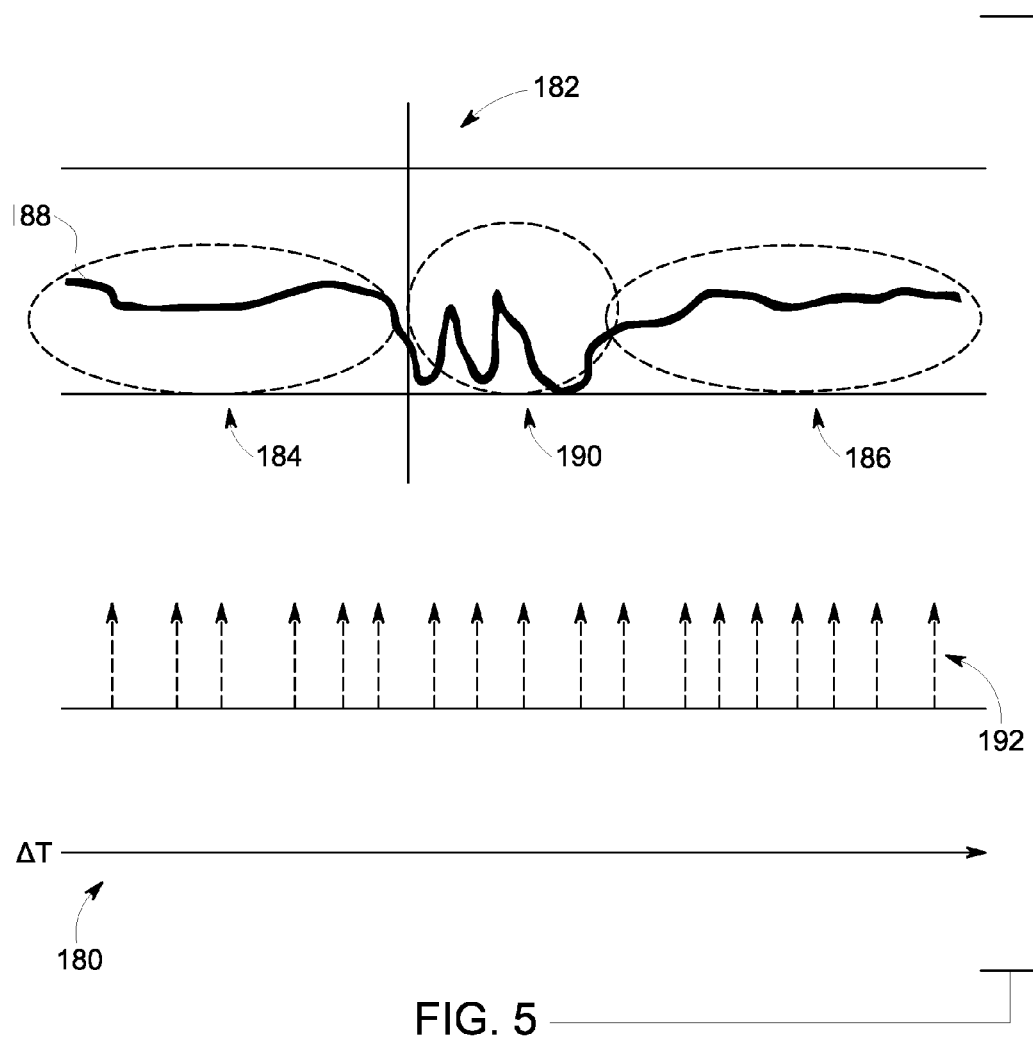
FIG. 5 is a diagram illustrating a Quality of Service (QoS) analysis in accordance with various embodiments.

The LAU 150 may also create a banked or stored bandwidth-time product. This is achieved by delaying the imagery display to the specialist for a period of $\Delta T$ seconds. The time interval $\Delta T$ is an effective bank or buffer to be used if the RHCP to specialist channel (e.g., the communication link 108) becomes momentarily unusable. FIG. 5 illustrates banking bandwidth in various embodiments. As can be seen in the graph 182 (where time is presented along the X axis and QoS of the channel along the Y axis), in regions 184 and 186, the QoS of the RHCP to specialist channel is slowly varying (based on defined variance over time level) and of sufficient quality to allow transmission to proceed by setting the ROI contraction mask and the degree of lossy compression to fit the bandwidth available. For example, in regions 184 and 186, the QoS represented by the curve 188 varies within a determined variance, which may be a predetermined variance. However, in the region 190, the QoS (based on the measured values illustrated by the arrows 192) of the channel is no longer stable and changing so rapidly (exceeding defined variances) and has such a lowered average value (e.g., below a defined value) that the channel is momentarily unusable. During such a period, transmission of data is halted and the banked time-bandwidth product is used to provide a smooth delivery of imagery at the specialist workstation 116. The banked time-bandwidth product may be acquired during times when processing is occurring at the RHCP workstation 102, but no image data is being transmitted, such as between a different scan sequences being processed for display and transmission or at the start of a transmission.

Various embodiments provide for controlling the transmission of image data via a communication link, particularly a communication link with a changing effective bandwidth. In particular, as described herein, a combination of signal processing and a control loop arrangement may be used to control, for example, ultrasound imaging over one or more channels having a dynamic effective bandwidth. As described herein, various embodiments may monitor, which can include continuously estimating an RHCP to specialist channel bandwidth, which is then forwarded to the RHCP transceiver 104 or computer 114 and used as feedback to control the transmission of the image data. Additionally, an RHCP or the defined ROI mask 170 may be applied to the RHCP imager and compression and/or progressive transmission of the ultrasound imagery may be performed. Also, as described herein, a selectable time interval may be used that extends the imagery sequence transmission time by $\Delta T$.

Figure 6:
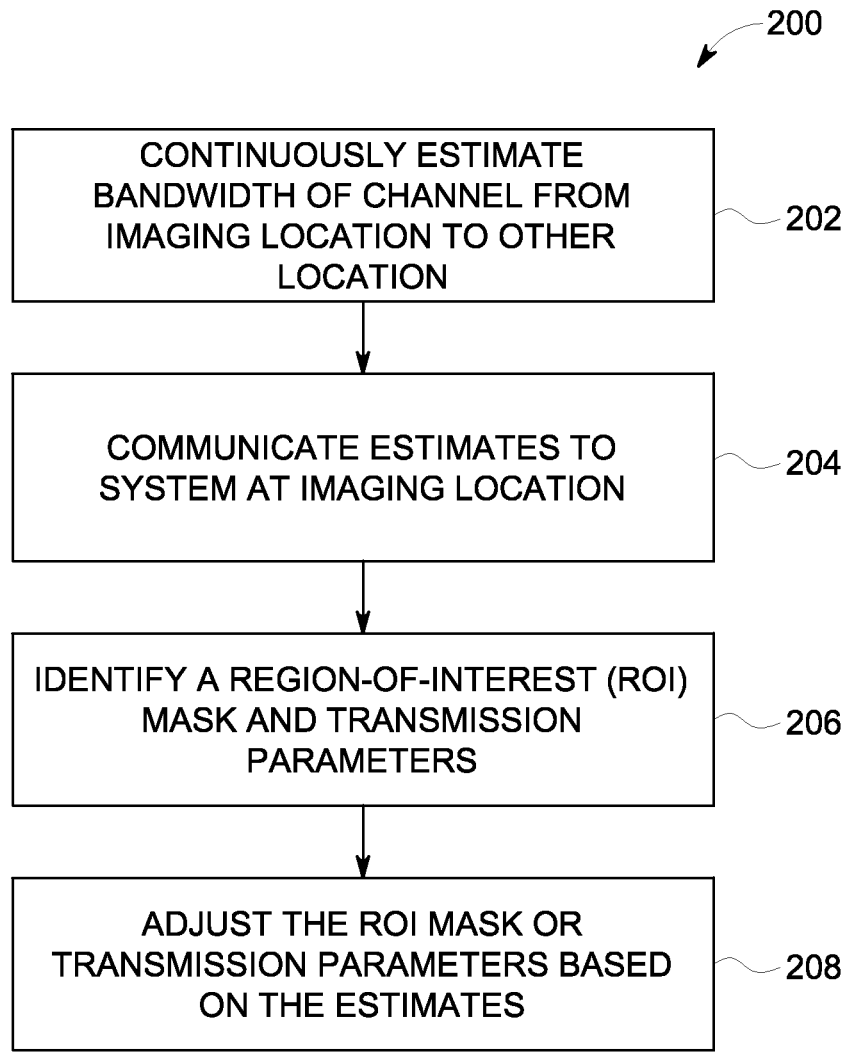
FIG. 6 is a method for controlling image data communication in accordance with various embodiments.

Using various embodiments, the monitoring (which in some embodiments includes the continuous estimating) of the QoS of the communication link 108 is performed. Thus, by dynamically evaluating the data channel, data flow may be controlled. For example, a method 200 for controlling image data communication is shown in FIG. 6. The method 200 generally provides for transmitting and displaying a series of ultrasound images from an imaging location to another location remote therefrom, wherein the series of images are displayed in a streaming manner. The method 200 in various embodiments includes monitoring bandwidth estimates of a communication channel at 202, such as continuously estimating the bandwidth of the channel between the imaging location and another location. For example, the locations may be a location where imaging is performed that is remote from a location, such as a medical facility, where a specialist or reviewer is located. The estimating at 202 may be performed using different methods and may include, for example, estimating the bandwidth latency, the packet error rate, packet loss and/or the jitter of the channels, among other parameters using any suitable method. The estimating at 202 in various embodiments includes determining a variability of the channel based on the one or more measured parameters, such that, for example, a QoS of the channel may be determined. The estimation in some embodiments includes predicating a rate and direction of change for the channel and not just point estimates. It should be noted that other suitable methods may be used for this purpose including time series regression, hidden Markov models, and Kalman filtering, among others. For example, because the information to be communicated is known (e.g., ultrasound images) and accordingly the expected data to be received is also known, a prediction of the rate and change of the effective channel bandwidth may be determined, such as using the measured parameters over a period of time.

The method 200 also includes communicating the estimates to the system at the imaging location at 204, for example, to control a transceiver at the imaging location as described in more detail herein. This estimate information provides a feedback loop that may be used to control the transmission of the image data over the channel.

The method 200 also includes identifying an ROI mask and/or transmission parameters at 206. For example, as described herein the ROI mask 270 may be selected by a user. In other embodiments, the ROI mask (e.g., size of the ROI mask) and/or the transmission parameters, for example, parameters for compression and progressive transmission of the image data are initially selected based on the estimates.

The method 200 also includes adjusting the ROI and/or the transmission parameters based on the estimates. For example, a compression rate for the data may be changed, which may include changing the compression rate inside and/or outside of the ROI mask. In some embodiments, the compression rates inside and outside are changed or adjusted differently, which in various embodiments includes adjusting the compression rate outside of the ROI before adjusting the compression rate inside the ROI.

In various embodiments, motion information may be used to define the ROI mask. For example, areas of motion within the series of images may be used to select a region for the ROI mask, which then defines how much data is communicated. For example, more data may be communicated corresponding to the area inside the ROI mask than outside the mask because the ROI mask includes therein moving regions that are of particular interest. It should be noted that the ROI mask may change shape, such as based on a user input or available bandwidth estimates. It also should be noted that while different regions are defined inside and outside the ROI mask, for example, the ROI mask 170 shown in FIG. 4, gradients of the regions may be used instead of the actual regions.

Thus, the ROI mask may be defined by the channel measurements to selected compression (e.g., rates or types) and/or frame rates inside and outside the ROI mask. In general, the compression and/or frame rate is defined such that more image data is communicated for the area inside the ROI mask than outside the ROI mask. It should be noted that the change in compression rates of having different compression may include using a different compression ratio, or in some embodiments, using a different type of compression.

It should be noted that a selectable time interval may be provided as described in more detail herein. For example, bandwidth may be accumulated or held to allow for a more continuous data stream, such as if there is an acceptable amount of delay.

It also should be noted that in some embodiments, the ROI mask may be automatically selected and initial compression and frame rate parameters set. For example, moving regions of the image (e.g., motion of heart valves) may be included in the ROI mask. Additionally, in some embodiments, sub-regions within the ROI mask or outside the ROI mask may be identified and include different compression or frame rates. For example, in color flow imaging different colors within the image may change at different rates. This can occur, for example, when venous flow and arterial flow are both visible, since venous flow tends to be continuous while arterial flow is pulsatile at the heart rate. In some embodiments, different colored regions having different rates of changes in color or intensity are used to change or adjust (or initially set) the compression and/or frame rates. In other embodiments, using known landmarks, areas of more blood flow may be predicted and included in the ROI mask, which may also be used to set or change the compression and/or frame rates.

It should be noted that various embodiments provide for increasing the likelihood that information of more clinical relevance (e.g., moving portions of the images) are communicated and displayed to the user remote from the imaging site in a manner that allows viewing and analysis thereof (e.g., a smoothly displayed series of images without jumping or starts/stops). In some embodiments, the compression scheme and/or frame rate may be changed based on a particular imaging preset or protocol, such as based on a particular scan to be performed.

In some embodiments, the frame rate may be reduced. For example, in various embodiments, ultrasound data may be acquired at 100 frames/second. These higher frame rates may be used for particular types of imaging, such as imaging the fetal heart. In these cases, the frame rate is typically not reduced, although the part of the ROI that is of particular interest may be very small. However, in other cases, for example, when the frame rate reaches 40 or 45 frames per second, such as because of the imaging depth or sector width, the frame rate may be reduced or limited since in general, this may not be clinically relevant or important. For example, in such cases, the data may be slowed, such as to 30 frames/second or other value, which may be a predetermined or defined value. Thus, in some embodiments, a determination is first made as to whether it is acceptable to reduce the frame rate (e.g., based on the type of imaging) before the frame rate is reduced.

Figure 7:
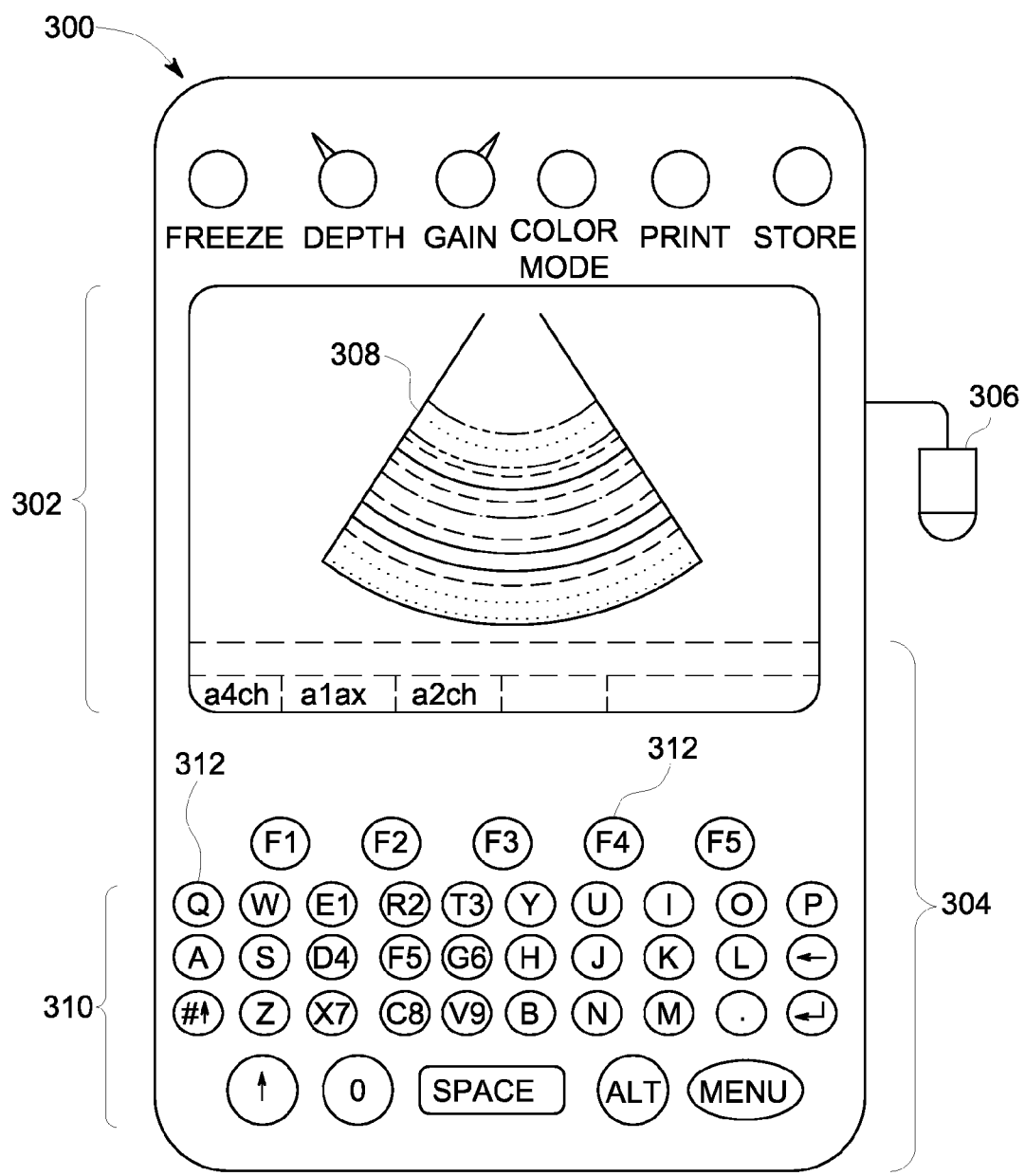
FIG. 7 illustrates a hand carried or pocket-sized ultrasound imaging system formed in accordance with an embodiment.

The various embodiments may be implemented in connection with different imaging systems, such as different ultrasound imaging systems. For example, FIG. 7 illustrates a hand carried or pocket-sized ultrasound imaging system 300 (which may be embodied as part of the image communication system 100 shown in FIG. 1). The ultrasound imaging system 300 may be configured to operate and communicate images as described in the method 200 (shown in FIG. 6). The ultrasound imaging system 300 has a display 302 and a user interface 304 formed in a single unit. By way of example, the ultrasound imaging system 300 may be approximately two inches wide, approximately four inches in length, and approximately half an inch in depth. The ultrasound imaging system may weigh approximately three ounces. The ultrasound imaging system 300 generally includes the display 302 and the user interface 304, which may or may not include a keyboard-type interface or touch screen and an input/output (I/O) port for connection to a scanning device, for example, an ultrasound probe 306. The display 302 may be, for example, a 320×320 pixel color LCD display on which a medical image 308 or series of medical images 308 may be displayed. A typewriter-like keyboard 310 of buttons 312 may optionally be included in the user interface 304.

The probe 306 may be coupled to the system 300 with wires, cable, or the like. Alternatively, the probe 306 may be physically or mechanically disconnected from the system 300. The probe 306 may wirelessly transmit acquired ultrasound data to the system 300 directly or through an access point device (not shown), such as an antenna disposed within the system 300.

Figure 8:
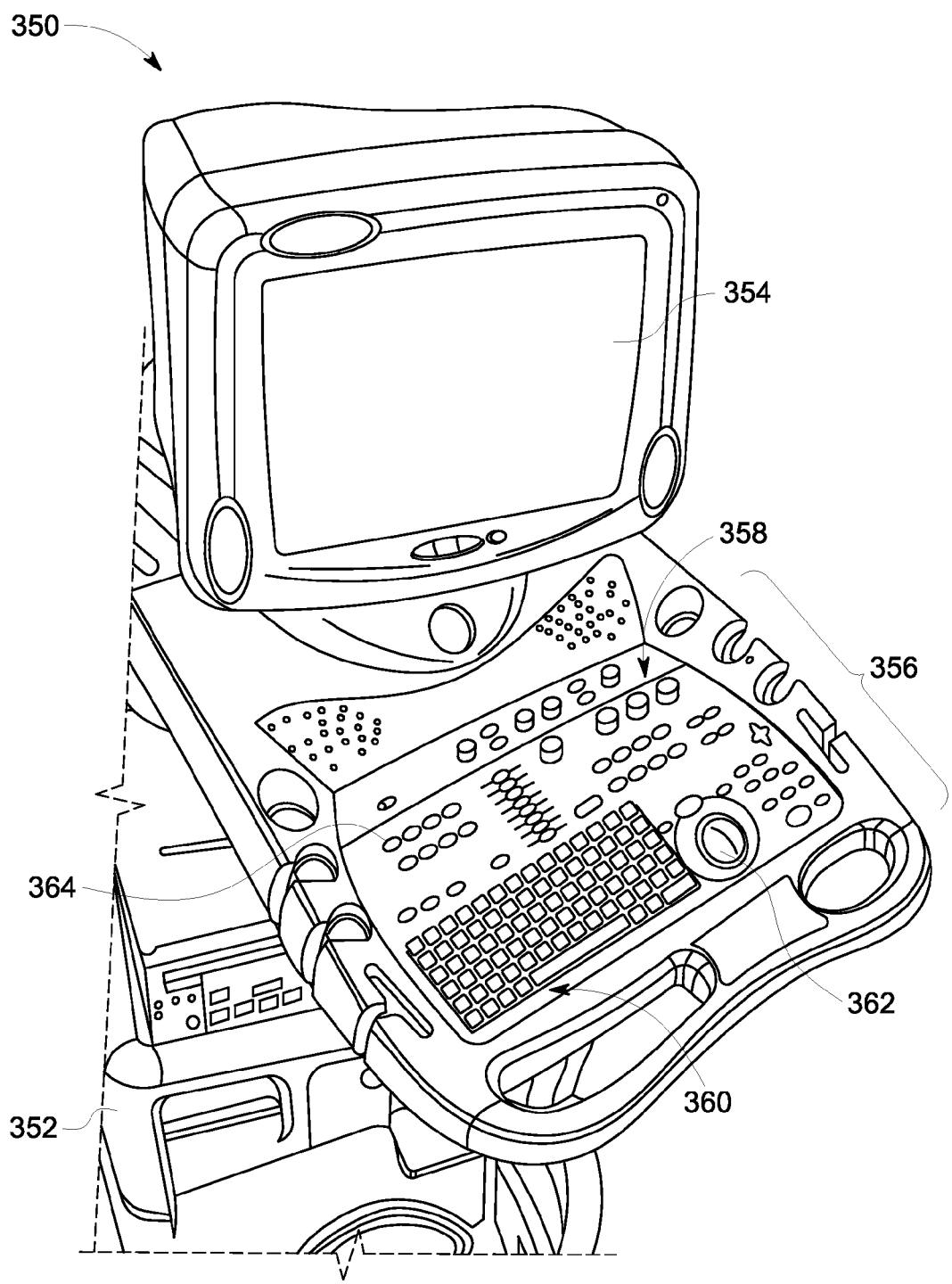
FIG. 8 illustrates an ultrasound imaging system formed in accordance with an embodiment and provided on a moveable base.

FIG. 8 illustrates an ultrasound imaging system 350 (which may be embodied as part of the image communication system 100) provided on a moveable base 352. The ultrasound imaging system 350 may be configured to operate as described in the method 200 (shown in FIG. 6). A display 354 and a user interface 356 are provided and it should be understood that the display 354 may be separate or separable from the user interface 356. The user interface 356 may optionally be a touchscreen, allowing an operator to select options by touching displayed graphics, icons, and the like.

The user interface 356 also includes control buttons 358 that may be used to control the system 350 as desired or needed, and/or as typically provided. The user interface 356 provides multiple interface options that the user may physically manipulate to interact with ultrasound data and other data that may be displayed, as well as to input information and set and change scanning parameters and viewing angles, etc. For example, a keyboard 360, trackball 362, and/or other controls 364 may be provided. One or more probes (such as the probe 136 shown in FIG. 2) may be communicatively coupled with the system 350 to transmit acquired ultrasound data to the system 350.

Figure 9:
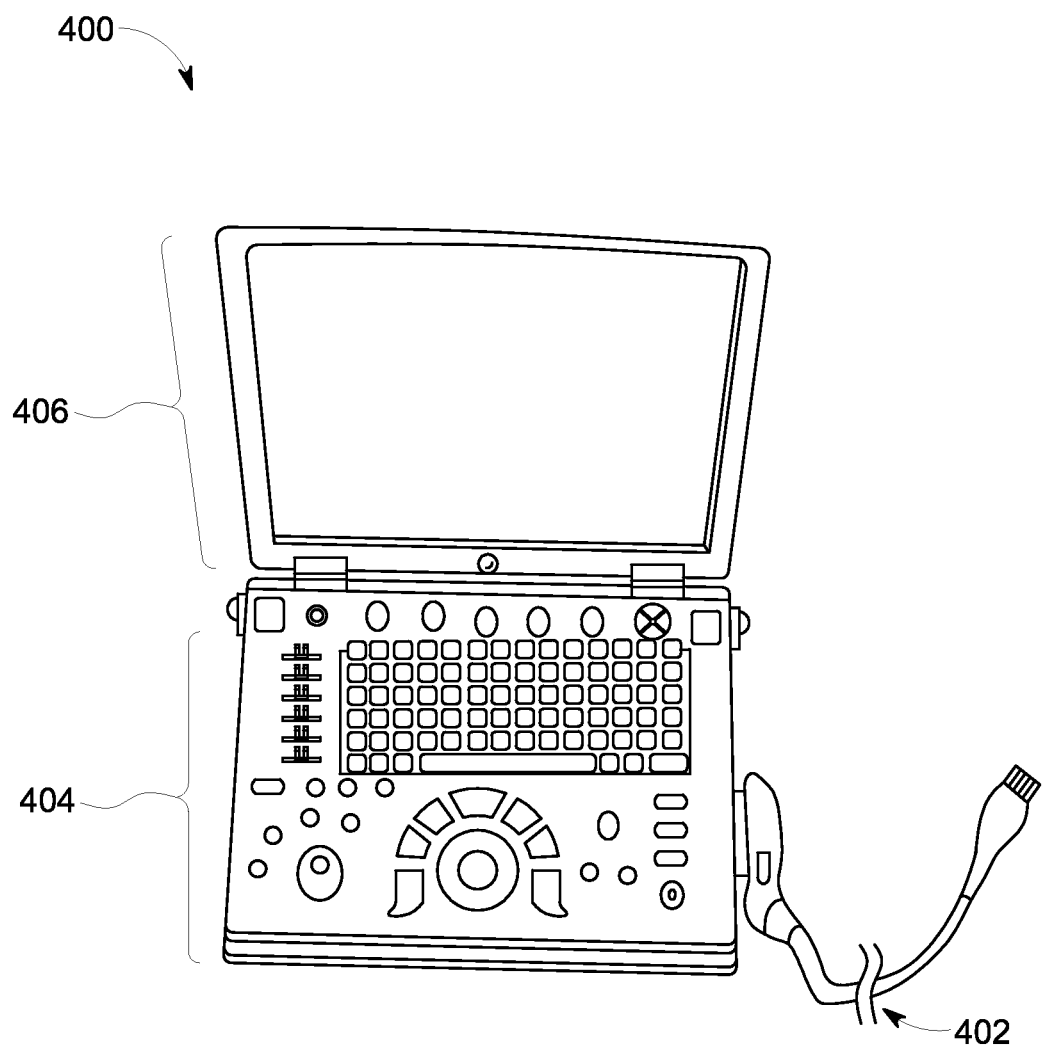
FIG. 9 illustrates a 3D-capable miniaturized ultrasound system formed in accordance with an embodiment.

FIG. 9 illustrates a 3D-capable miniaturized ultrasound system 400 (which may be embodied as part of the image communication system 100). The ultrasound imaging system 400 may be configured to operate as described in the method 200 shown in FIG. 6). The ultrasound imaging system 400 has a probe 402 that may be configured to acquire 3D ultrasonic data or multi-plane ultrasonic data. A user interface 404 including an integrated display 406 is provided to receive commands from an operator. As used herein, "miniaturized" means that the ultrasound system 400 is a handheld or hand-carried device or is configured to be carried in a person's hand, pocket, briefcase-sized case, or backpack. For example, the ultrasound system 400 may be a hand-carried device having a size of a typical laptop computer. The ultrasound system 400 is easily portable by the operator, such as in locations remote from a hospital or major health care facility. The integrated display 406 (e.g., an internal display) is configured to display, for example, one or more medical images.

One or more embodiments may provide real-time transmission of data to enable clinically viable examination and diagnosis from different locations.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, flash drive, jump drive, USB drive and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the described subject matter without departing from their scope. While the dimensions and types of materials described herein are intended to define the parameters of the various embodiments, the embodiments are by no means limiting and are exemplary embodiments. Many other embodiments will be apparent to one of ordinary skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable one of ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for controlling transmission of medical images, the method comprising:
    monitoring over time estimates of bandwidth of a channel communicatively coupling an imaging location with another location remote from the imaging location;
    communicating the estimates to a system at the imaging location;
    identifying at least one of a region-of-interest (ROI) mask or one or more transmission parameters for the channel; and
    adjusting at least one of the ROI mask or the one or more transmission parameters based on the monitored estimates of the bandwidth for communicating the medical images, wherein adjusting the ROI mask includes adjusting at least one of a compression or a frame rate of the ROI mask such that the at least one of the compression or the frame rate within the ROI mask is different than the at least one of the compression or the frame rate outside of the ROI mask.

2. The method of claim 1, wherein the monitoring comprises continuously determining estimates of the bandwidth over time.

3. The method of claim 1, wherein the ROI mask is selected based on one or more moving portions of a series of images communicated over the channel.

4. The method of claim 1, further comprising selecting a time interval for extending an imagery sequence transmission time of medical images over the channel.

5. The method of claim 1, wherein adjusting the ROI mask comprises adjusting one or more of a size of the ROI mask or an area of the ROI mask.

6. The method of claim 1, wherein adjusting the ROI mask comprises moving a center of the ROI mask.

7. The method of claim 1, wherein adjusting one or more transmission parameters comprises adjusting the parameters of compression and progressive transmission including at least one of adjusting image pixel sixes or a number of pixel quantization levels.

8. The method of claim 1, wherein the medical images comprise a series of ultrasound images over time.

9. The method of claim 1, wherein the adjusting comprises adjusting one of a compression or frame rate based on a changing characteristic of the medical images.

10. The method of claim 9, wherein the medical images are color flow ultrasound images, and the adjusting is based on a rate of change of one or more colors in the ultrasound images.

11. An image communication system comprising:
a first workstation located at one location, the workstation configured to acquire medical images from an imaging apparatus;
a transceiver coupled to the first workstation;
a second workstation at a location remote from the first workstation;
a transceiver coupled to the second workstation, the transceivers coupled to the first and second workstations forming a communication link therebetween; and
a link analysis unit (LAU) at the location of the second workstation, the LAU configured to monitor over time estimates of bandwidth of the communication link and communicate the estimates to the first workstation or the transceiver coupled to the first workstation, wherein the LAU is configured to adjust at least one of a region-of-interest (ROI) mask or one or more transmission parameters for the communication link based on the monitored estimates of the bandwidth for communicating the medical images, and wherein the LAU is configured to adjust at least one of a compression or a frame rate of the ROI mask such that the at least one of the compression or the frame rate within the ROI mask is different than the at least one of the compression or the frame rate outside of the ROI mask.

12. The image communication system of claim 11, wherein the LAU is configured to continuously determine estimates of the bandwidth over time.

13. The image communication system of claim 11, wherein the second workstation comprises a user interface configured to receive a user input selecting a time interval for extending an imagery sequence transmission time of the medical images over the channel.

14. The image communication system of claim 11, further comprising a user interface allowing one or more of adjustment of a size of the ROI mask, adjustment of an area of the ROI mask, or movement of a center of the ROI mask.

15. The image communication system of claim 11, wherein the medical images comprise a series of ultrasound images over time.

16. The image communication system of claim 15, wherein the ultrasound images are color flow ultrasound images, and the adjusting is based on a rate of change of one or more colors in the ultrasound images or movement within the images.

17. A non-transitory computer readable storage medium for controlling the communication of medical images over a channel using one or more processors, the non-transitory computer readable storage medium including instructions to command the one or more processors to:
monitor over time estimates of bandwidth of a channel communicatively coupling an imaging location with another location remote from the imaging location;
communicate the estimates to a system at the imaging location;
identify at least one of a region-of-interest (ROI) mask or one or more transmission parameters for the channel; and
adjust at least one of the ROI mask or the one or more transmission parameters based on the monitored estimates of the bandwidth for communicating the medical images, wherein the instructions command the one or more processors to adjust at least one of a compression or a frame rate of the ROI mask such that the at least one of the compression or the frame rate within the ROI mask is different than the at least one of the compression or the frame rate outside of the ROI mask.

18. The non-transitory computer readable storage medium of claim 17, wherein the instructions command the one or more processors to repeatedly determine estimates of the bandwidth over time.

19. The non-transitory computer readable storage medium of claim 17, wherein the instructions command the one or more processors to adjust one or more of a size of the ROI mask, an area of the ROI mask, or a center of the ROI mask.

* * * * *